(12) United States Patent
Walker et al.

(10) Patent No.: US 8,666,105 B2
(45) Date of Patent: Mar. 4, 2014

(54) SUBWOOFER MOUNTING BRACKET

(75) Inventors: William Walker, Farmington Hills, MI (US); Chris Matthews, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 407 days.

(21) Appl. No.: 12/905,380

(22) Filed: Oct. 15, 2010

(65) Prior Publication Data

US 2012/0091866 A1  Apr. 19, 2012

(51) Int. Cl.
*H04R 25/00* (2006.01)
(52) U.S. Cl.
USPC .............................. 381/386; 381/86; 381/389
(58) Field of Classification Search
USPC ............. 381/302, 86, 87, 332, 386, 387, 388, 381/389, 395; 181/150, 199; 248/342, 343
See application file for complete search history.

(56) References Cited

U.S. PATENT DOCUMENTS

| 5,048,089 A * | 9/1991 | Moore .............................. 381/87 |
| 8,103,041 B2 * | 1/2012 | Koch et al. ..................... 381/386 |
| 2007/0098204 A1 * | 5/2007 | Iekura ........................... 381/386 |

* cited by examiner

*Primary Examiner* — Huyen D Le
(74) *Attorney, Agent, or Firm* — Young, Basile, Hanlon & MacFarlane, P.C.

(57) ABSTRACT

Disclosed herein are embodiments of a speaker mounting assembly. In one such embodiment, the speaker mounting assembly comprises a speaker housing having a housing support surface, a speaker mounting bracket having a base surface, a projection extending from one of the speaker housing and the speaker mounting bracket and a mounting structure formed on the other of the speaker housing and the speaker mounting bracket. The mounting structure is configured to receive the projection such that the housing support surface contacts the base surface when the projection is received in the mounting structure. The mounting structure has an anti-rotation structure configured to prevent rotation of the speaker housing with respect to the speaker mounting bracket.

16 Claims, 6 Drawing Sheets

SUBWOOFER MOUNTING BRACKET

TECHNICAL FIELD

The present invention generally pertains to vehicle speaker mounting brackets and in particular to subwoofer mounting brackets with anti-rotation features.

BACKGROUND

Premium audio systems with subwoofers are increasingly becoming a stock standard in many vehicles, especially in luxury vehicles. The subwoofers are usually packaged in an enclosure designed to produce the best acoustics for the subwoofer. The enclosures are then mounted in the vehicle, typically in the rear of the vehicle, and more specifically in the cargo or trunk area. In SUVs, to mount the subwoofer enclosure to the vehicle, a subwoofer mounting bracket is coupled to the floor panel in the cargo area which mates with a foot formed on the subwoofer enclosure.

Some typical subwoofer enclosures have been "spare tire" type enclosures, named after their circular shape resembling a spare tire. The foot on the bottom of a spare tire enclosure is circular as well, and the subwoofer mounting bracket includes a foot receiving portion shaped and sized to correspond to the foot to locate the enclosure within the bracket. A fastener is then driven through the middle of the enclosure to complete the mounting. With a circular enclosure and a central fastening point, orientation of the enclosure is not a concern.

In certain vehicles, the subwoofer enclosure can have an elongated shape, thus requiring a specific orientation when being mounted. The circular bracket with circular foot receiving area cannot adequately be carried over to interact with a circular foot formed on the elongated enclosure because the enclosure would rotate out of the required orientation while the fastener was being driven to mount the enclosure.

SUMMARY

Embodiments of a speaker mounting assembly are disclosed herein. In one such embodiment, the speaker mounting assembly comprises a speaker housing having a housing support surface, a speaker mounting bracket having a base surface, a projection extending from one of the speaker housing and the speaker mounting bracket and a mounting structure formed on the other of the speaker housing and the speaker mounting bracket. The mounting structure is configured to receive the projection such that the housing support surface contacts the base surface when the projection is received in the mounting structure. The mounting structure has an anti-rotation structure configured to prevent rotation of the speaker housing with respect to the speaker mounting bracket.

Another embodiment of a speaker mounting assembly disclosed herein is for use in a vehicle compartment having a body panel and comprises a speaker housing, a foot extending from the speaker housing, the foot having a housing support surface and a mounting bracket coupled to the body panel. The mounting bracket comprises a first surface facing the body panel, a second surface opposite the first surface and facing away from the body panel and a foot receiving structure formed on the second surface and having an anti-rotation structure. The foot receiving structure is configured to receive the foot such that the housing support surface contacts the second surface when the foot is received in the foot receiving structure. The anti-rotation structure prevents rotation of the speaker housing with respect to the speaker mounting bracket.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
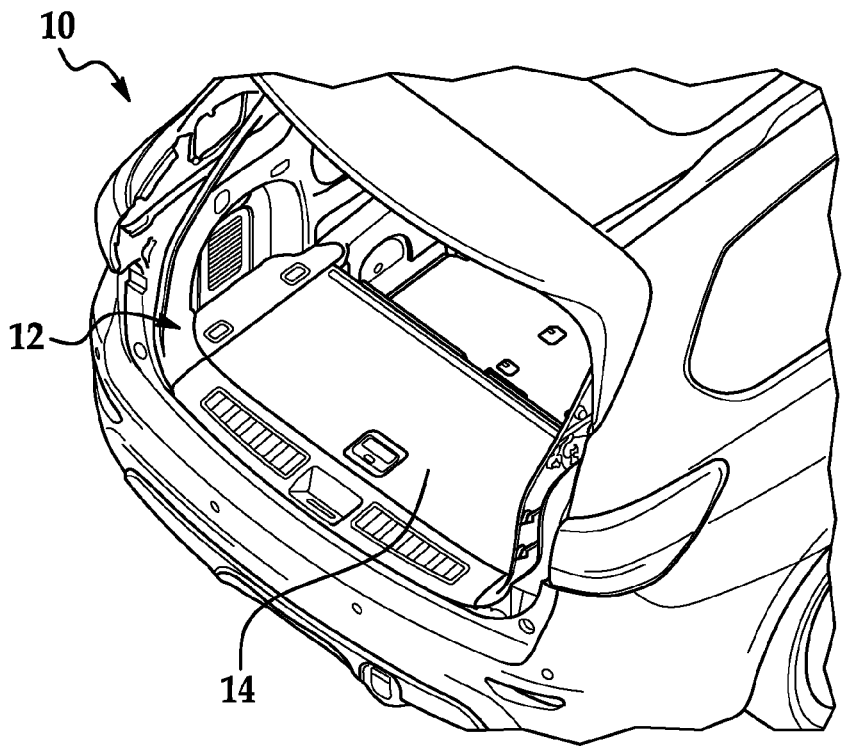
FIG. 1 is a perspective view of the vehicle cargo area with the storage compartment.

FIG. 1 illustrates a vehicle 10 having a cargo area 12. The cargo area 12 can be a trunk of a sedan or the rear compartment of a sport utility vehicle or wagon, for example. A storage compartment 14 is located in the cargo area 12 to store vehicle components such as the spare tire and the subwoofer of the sound system. The cargo area 12 is used as illustration. The use of any area within the vehicle having the requisite storage capacity is contemplated.

Figure 2:
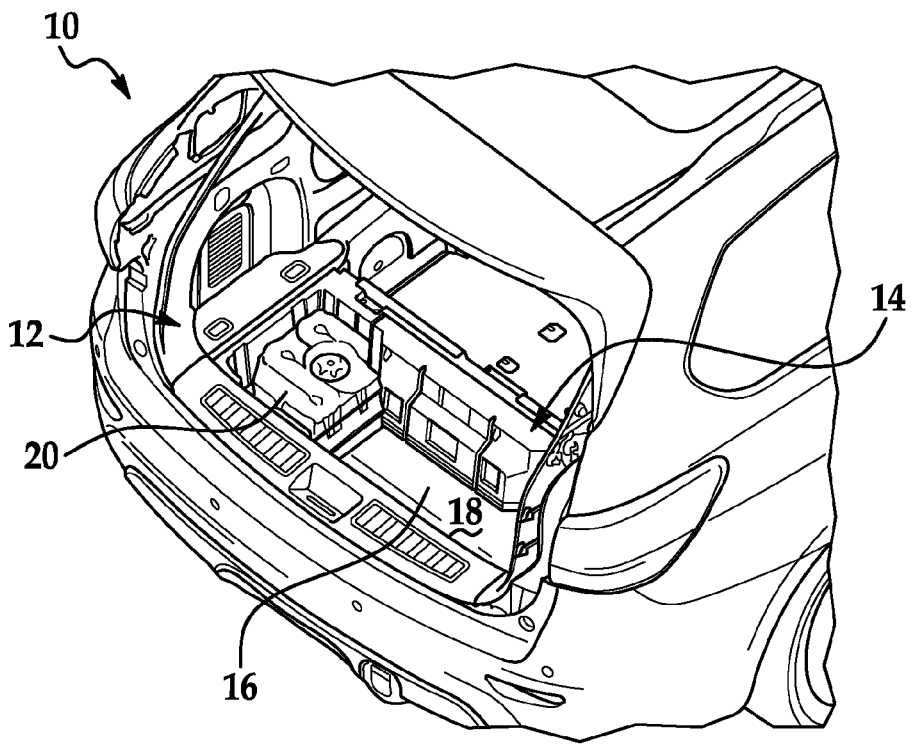
FIG. 2 is a perspective view of the vehicle cargo area with the lid removed from the storage compartment to show the speaker housing.

FIG. 2 is a perspective view of the storage compartment 14 showing a cavity 16 having a floor 18, with a speaker mounting assembly 20 located within the cavity 16. The speaker mounting assembly 20 is shown on one side of the cavity 16 by means of example. The assembly 20 can be located at any position desired or required within the cavity 16. There is an opening 17 (shown in FIG. 9) within the floor 18 over which the speaker mounting assembly 20 is positioned.

Figure 3:
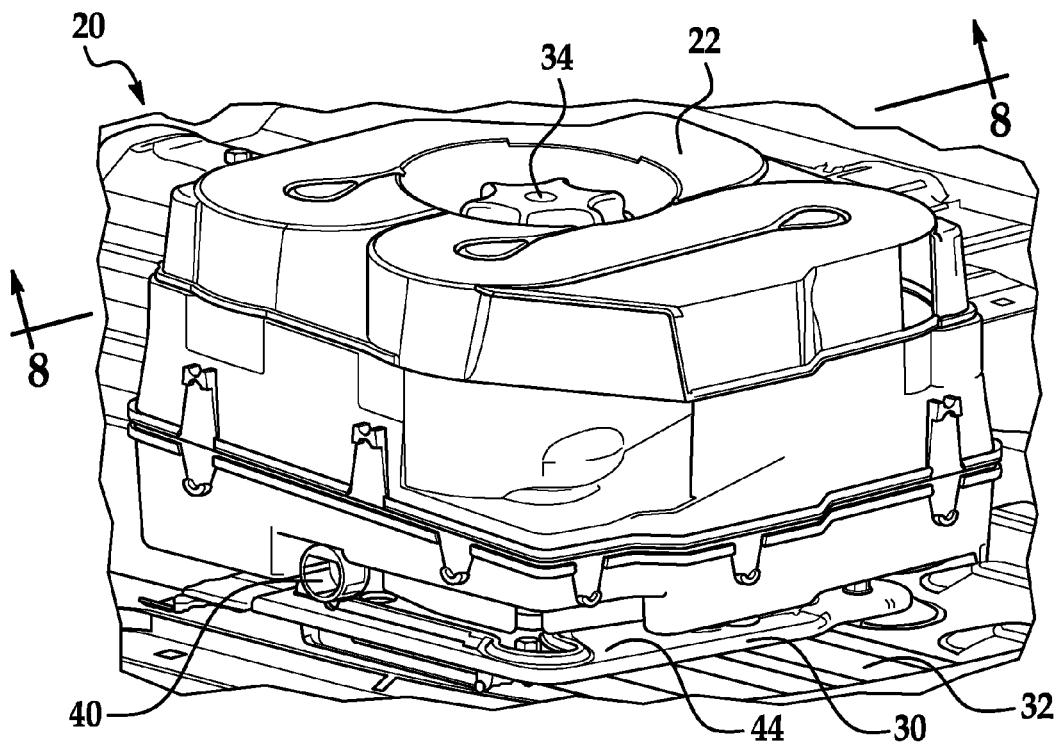
FIG. 3 is a cut away view of the storage compartment to show a perspective view of an embodiment of the speaker mounting assembly disclosed herein and the storage bin removed.
Figure 4:
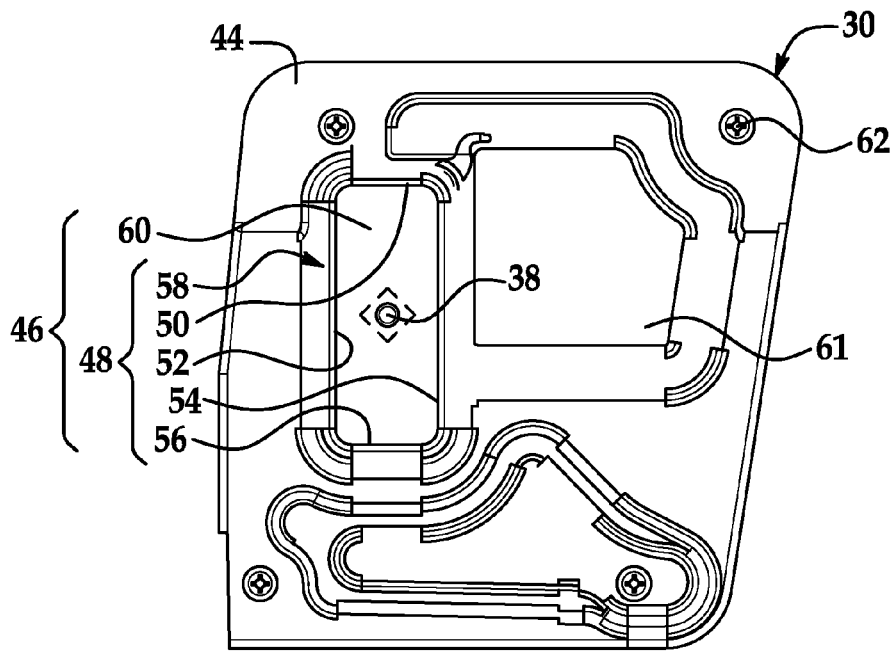
FIG. 4 is a top view of the mounting bracket.
Figure 11:
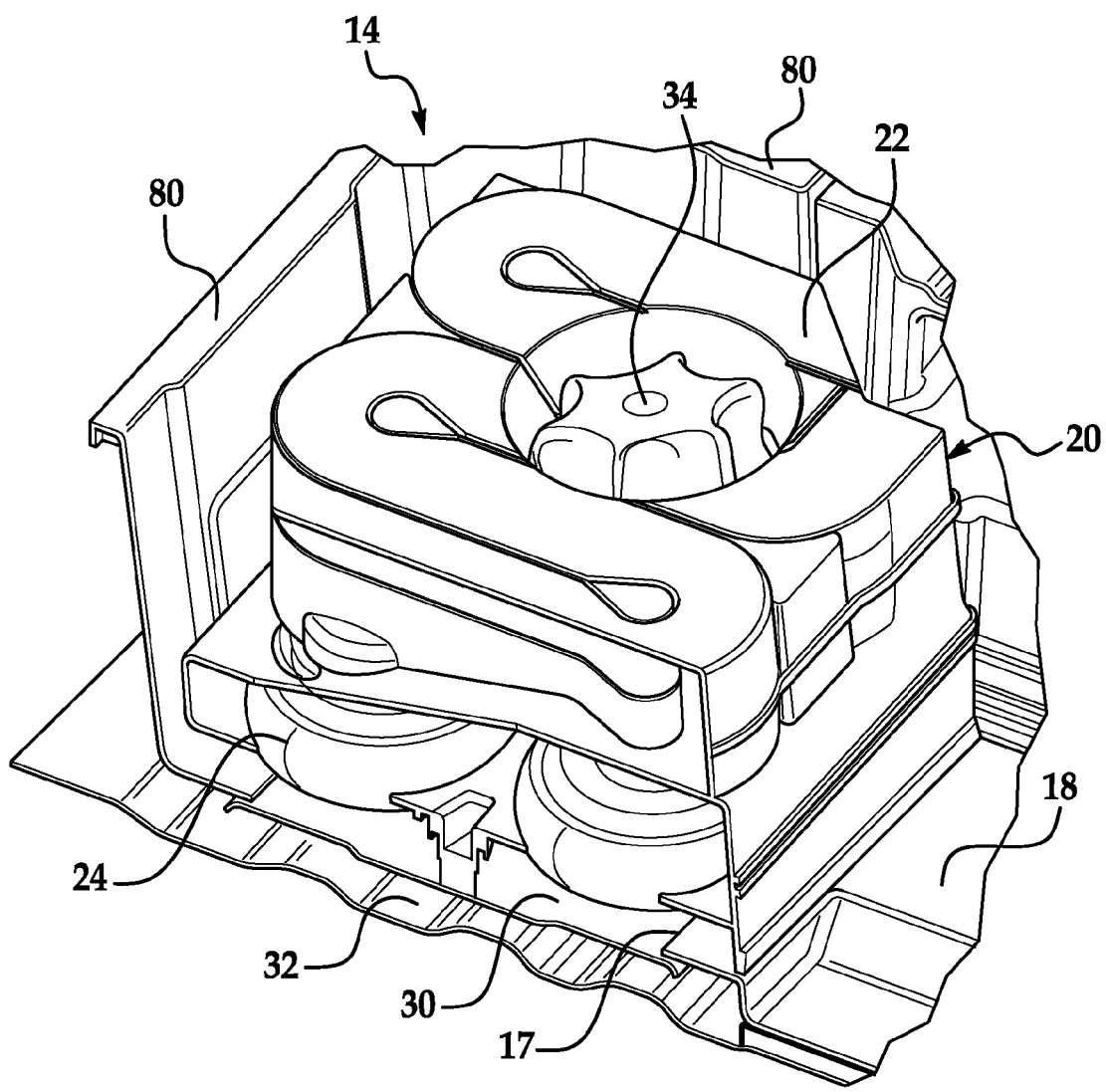
FIG. 11 is an enlarged cut away perspective view of the storage compartment with the speaker mounting assembly disclosed herein.

FIG. 3 is a cut away view of the storage compartment 14 providing a perspective view of the speaker mounting assembly 20. The speaker mounting assembly 20 includes a speaker housing 22 within which the subwoofer 24, seen in FIG. 11, is located. Although a subwoofer is used herein, it is also contemplated that speaker mounting assembly 20 be used to house any speaker used in a vehicle sound system. The speaker mounting assembly 20 also includes a speaker mounting bracket 30 mounted beneath the opening 17 within the floor 18 of the storage compartment 14 and attached to a body panel 32 of the vehicle 10. As shown herein, the body panel 32 is a floor panel. This configuration is provided as illustration and is not meant to be limiting. The opening 17 could be in a wall of the storage compartment 14 with the speaker mounting bracket 30 attached to a different vehicle body panel. A fastener 34 extends through a first fastener receiving aperture 36 defined in the speaker housing 22, through the opening 17 in the floor 18 of the storage compartment 14 and through a second fastener receiving aperture 38 in the mounting bracket 30 to secure the speaker housing 22 to the speaker mounting bracket 30. The second fastener receiving aperture 38 is best seen in FIG. 4. The electrical connector 40 shown in FIG. 3 connects the electrical wires from the subwoofer through a wall or floor of the storage compartment 14.

FIG. 4 is a top plan view of the speaker mounting bracket 30. The speaker mounting bracket 30 has a first surface 42 facing the body panel 32, shown in FIG. 7, and a second surface 44 facing away from the body panel 32 and toward the speaker housing 22. A foot receiving structure 46 is formed on the second surface 44. The foot receiving structure 46 includes an anti-rotation structure 48 having at least two non-coplanar projection engagement surfaces. As illustrated herein, the at least two non-coplanar projection engagement surfaces of the anti-rotation structure 48 include a first foot engaging surface 50, a second foot engaging surface 52, a third foot engaging surface 54, and a fourth foot engaging surface 56.

The anti-rotation structure 48 can be an emboss 58 extending from the second surface 44 and defining the non-coplanar projection engagement surfaces, shown as first, second, third and fourth foot engaging surfaces 50, 52, 54, 56 and extending substantially perpendicularly from the second surface 44. However, it is also contemplated that the anti-rotation structure 48 can be formed of at least two non-coplanar projection engagement surfaces that include one or more members attached to the second surface 44 of the speaker mounting bracket 30. The emboss 58 can further define a portion of the second surface 44 as a countersunk base surface 60 within the at least two non-coplanar projection engagement surfaces. As shown, the countersunk base surface 60 is surrounded by first, second, third and fourth foot engaging surfaces 50, 52, 54, 56.

The foot receiving structure 46 shown has first, second, third and fourth foot engaging surfaces 50, 52, 54, 56 as the non-coplanar projection engagement surfaces defining a rectangle in the figures for means of illustration. However, the foot receiving structure 46 is not limited to a rectangle. The at least two non-coplanar projection engagement surfaces of the foot receiving structure 46 can define any polygonal shape known to those skilled in the art.

The speaker mounting bracket 30 can coupled to the body panel 32 with any attachment means known to those skilled in the art, such as the fasteners 62 shown in FIG. 3. Four fasteners 62 are shown as a non-limiting example. Any number of fasteners can be used as desired or required by those skilled in the art. The speaker mounting bracket 30 can also have one or more cut-outs 61 to reduce the weight of the bracket 30.

Figure 5:
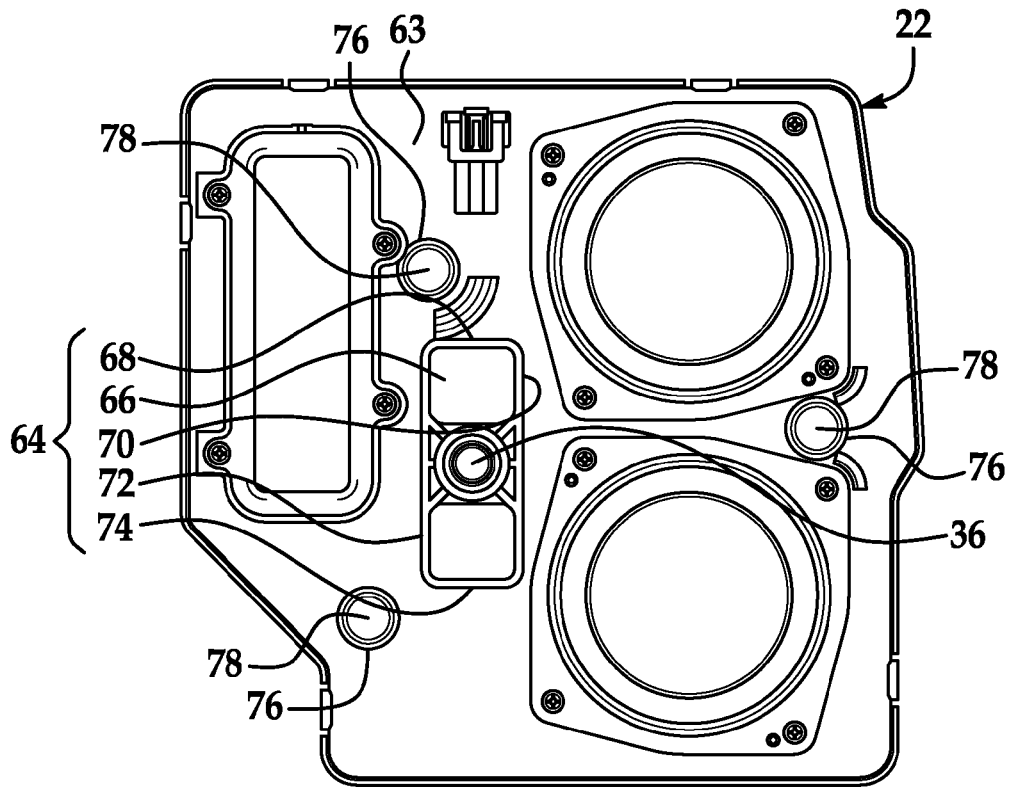
FIG. 5 is a plan view of the speaker housing.

FIG. 5 is a plan view of the wall 63 of the speaker housing 22 that faces the mounting bracket 30. A projection or foot 64 extends from the wall 63 of the speaker housing 22, with the foot 64 having a housing support surface 66. The foot 64 is configured to be received in the foot receiving structure 46 of the mounting bracket 30 such that the housing support surface 66 contacts the countersunk base surface 60 of the foot receiving structure 46. When the foot 64 is received by the foot receiving structure 46, the anti-rotation structure 48 prevents rotation of the speaker housing 22 with respect to the speaker mounting bracket 30.

The foot 64 has at least two non-coplanar wall surfaces. As illustrated herein, the non-coplanar wall surfaces include first wall surface 68, second wall surface 70, third wall surface 72 and fourth wall surface 74. The non-coplanar wall surfaces of the foot 64 can be embossed in the housing or can be formed of one or more members attached to the speaker housing 22. When the foot 64 is received within the foot receiving structure 46, at least two of the non-coplanar wall surfaces of the foot 64 align with at least two of the non-coplanar projection engaging surfaces such that the alignment prevents rotation of the speaker housing 22 with respect to the speaker mounting bracket 30. As illustrated in FIGS. 5-8, the first through fourth wall surfaces 68, 70, 72, 74 are configured to align within the first, second, third and fourth foot engaging surfaces 50, 52, 54, 56 such that the housing support surface 66 contacts the countersunk base surface 60. As shown with the rectangle, all wall surfaces of the foot 64 can align with all projection engagement surfaces of the foot receiving structure 46.

The foot 64 shown has first, second, third and fourth wall surfaces 68, 70, 72, 74 as the non-coplanar projection engagement surfaces defining a rectangle in FIG. 5 for means of illustration, as noted above. However, the foot 64 is not limited to a rectangle. The foot 64 can be any polygonal shape known to those skilled in the art so long as at least two non-coplanar wall surfaces align with at least two non-coplanar projection engagement surfaces within the polygonal shape. As used herein, "polygonal" means non-circular.

As used herein, "two non-coplanar surfaces" includes an enclosed polygonal shape, an opened shape having a non-circular partial pattern, symmetrical non-circular shapes, asymmetrical shapes, or more than one shape, including non-concentric circular shapes and non-circular surfaces. Any combination of these is also contemplated. Another embodiment of the foot 64 can include an angled wall, such as a V or L shape. The foot 64 can also be keyhole shaped with the foot receiving structure 46 a corresponding key shape. Rather than a foot, two or more projections can extend from the wall 63 and configured to be received in corresponding apertures in the mounting bracket 30. The two non-coplanar surfaces can also align the first and second fastener receiving apertures 36, 38 with each other, thereby allowing smooth installation of the fastener 34.

The first fastener receiving aperture 36 is shown centered within the foot 64 of the speaker housing 22 of FIG. 5, while the second fastener receiving aperture 38 is shown in the center of the countersunk base surface 60 of the mounting bracket 30 of FIG. 4. This is shown by way of example and not meant to be limiting. The first and second fastener receiving apertures 36, 38 can be located elsewhere so long as the apertures are aligned when the speaker housing 22 is properly aligned over the mounting bracket 30 and enough force is placed on the speaker housing 22 and mounting bracket 30 to prevent vibration or rattling between the foot 64 and the foot receiving structure 46.

Figure 6:
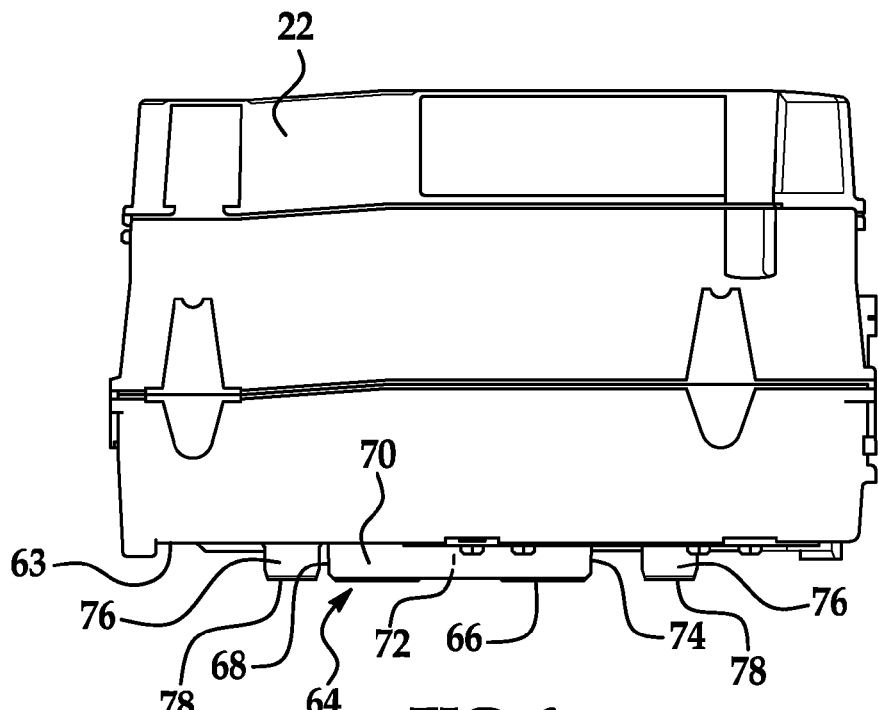
FIG. 6 is a side view of the speaker housing.

FIG. 6 is a side view of the speaker housing 22. The first, second, third and fourth wall surfaces 68, 70, 72, 74 of the foot 64 are shown extending from the wall 63 of the speaker housing 22. The wall surfaces 68, 70, 72, 74 can extend substantially perpendicular to the wall 63 of the speaker housing 22. The housing support surface 66 is also shown. In both FIGS. 5 and 6 support legs 76 are shown extending from the wall 63 of the speaker housing 22. Three support legs 76 are illustrated; however, any number of support legs 76 can be used. The support legs 76 are provided to maintain distance between the speaker housing 22 and the mounting bracket 30 with the exception of the foot 64 and foot receiving structure 46. Padding can be added to the support legs 76 to prevent any vibration or rubbing between the support legs 76 and the second surface 44 of the mounting bracket 30. As seen in FIG.

6, the housing support surface 66 can be coplanar with an end surface 78 of the support legs 76.

Figure 7:
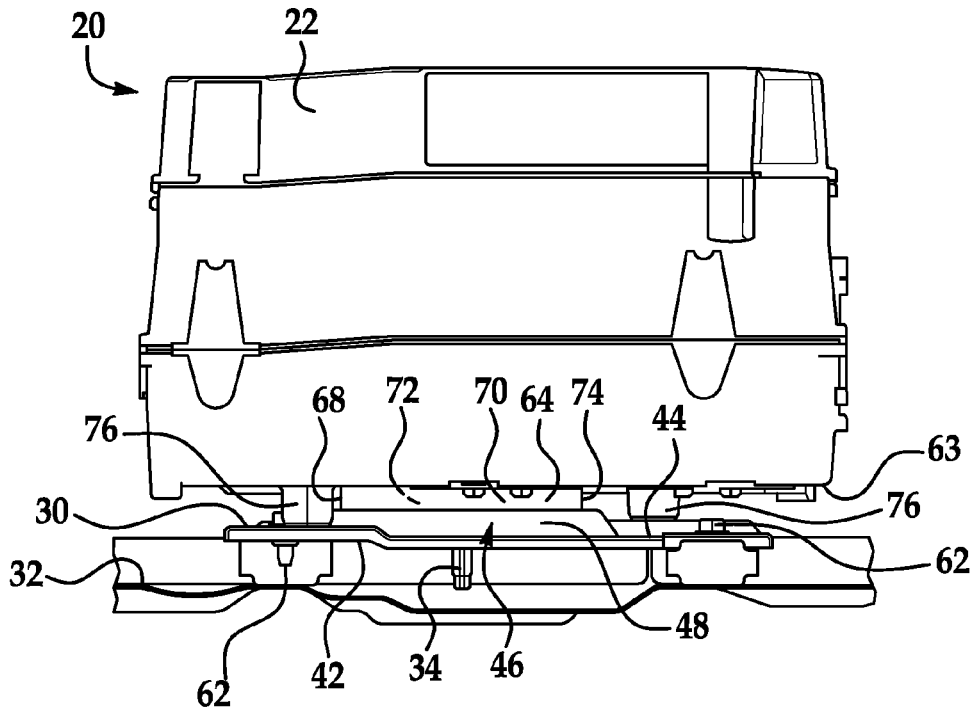
FIG. 7 is a side view of the speaker mounting assembly.

FIG. 7 is a side view of the speaker mounting assembly 20. The speaker housing 22 is shown mounted to the speaker mounting bracket 30, which in turn is attached to the body panel 32 of the vehicle 10. The fastener 34 can be seen extending through the second fastener receiving aperture 38 of the mounting bracket 30. The first, second, third and fourth wall surfaces 68, 70, 72, 74 of the foot 64 are received within the anti-rotation structure 48 of the foot receiving structure 46.

Figure 8:
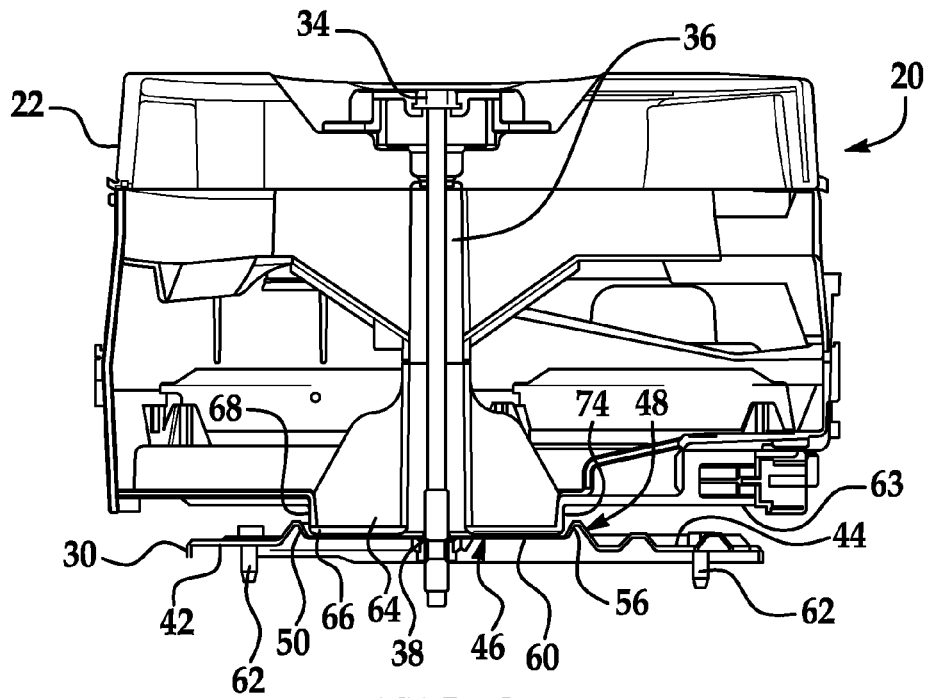
FIG. 8 is a cross-sectional view of the speaker mounting assembly taken along line 8-8 in FIG. 3.

FIG. 8 is a cross sectional view of the speaker mounting assembly 20 along line 8-8 in FIG. 3. The fastener 34 is shown extending through the first fastener receiving aperture 36 in the speaker housing 22 and the second fastener receiving aperture 38 in the speaker mounting bracket 30. The cross sectional view of the foot 64 and the foot receiving structure 46 illustrates the housing support surface 66 contacting the countersunk base surface 60. Two of the non-coplanar wall surfaces 68, 74 extend substantially perpendicularly with respect to the housing support surface 66, while two of the non-coplanar foot engagement surfaces 50, 56 extend substantially perpendicularly from the countersunk base surface 60. The wall surface 68 aligns with the foot engagement surface 50 while the wall surface 74 aligns with the foot engagement surface 56.

The components of the speaker housing 22 described herein can be located on the mounting bracket 30, while components of the mounting bracket 30 disclosed herein can be located on the speaker housing 22. For example, the projection or foot 64 can be located on the mounting bracket while the foot receiving structure 46 can be a mounting structure on the speaker housing 22.

Figure 9:
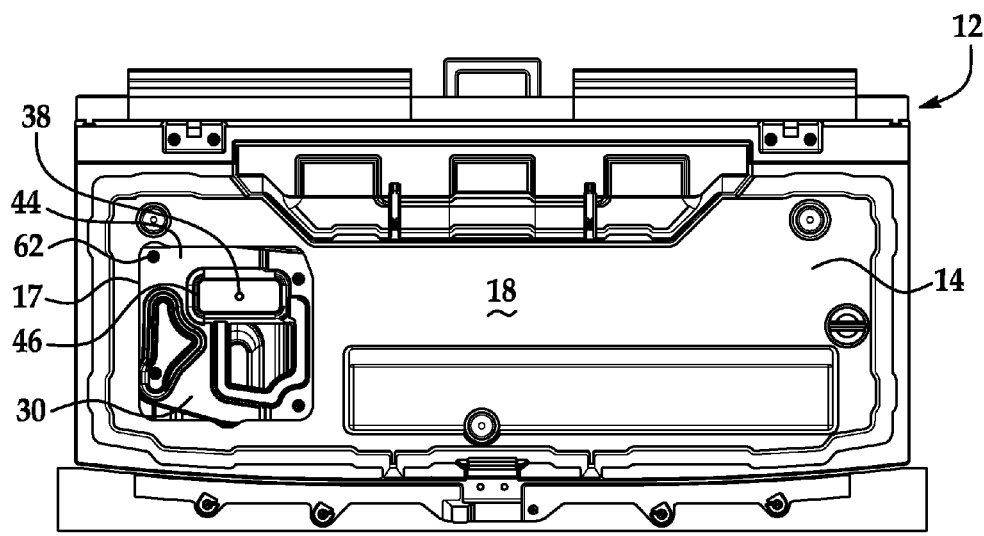
FIG. 9 is a plan view of the storage compartment with only the speaker mounting bracket of an embodiment of the speaker mounting assembly disclosed herein.

FIG. 9 is a plan view of the storage compartment 14 with only the mounting bracket 30 of the speaker mounting assembly 20 installed. The mounting bracket 30 is installed and attached to the body panel 32 of the vehicle 10 with fasteners 62 before the storage compartment 14 is installed in the cargo area 12. As seen, the opening 17 in the floor 18 of the storage compartment 14 is aligned over the mounting bracket 30.

Figure 10:
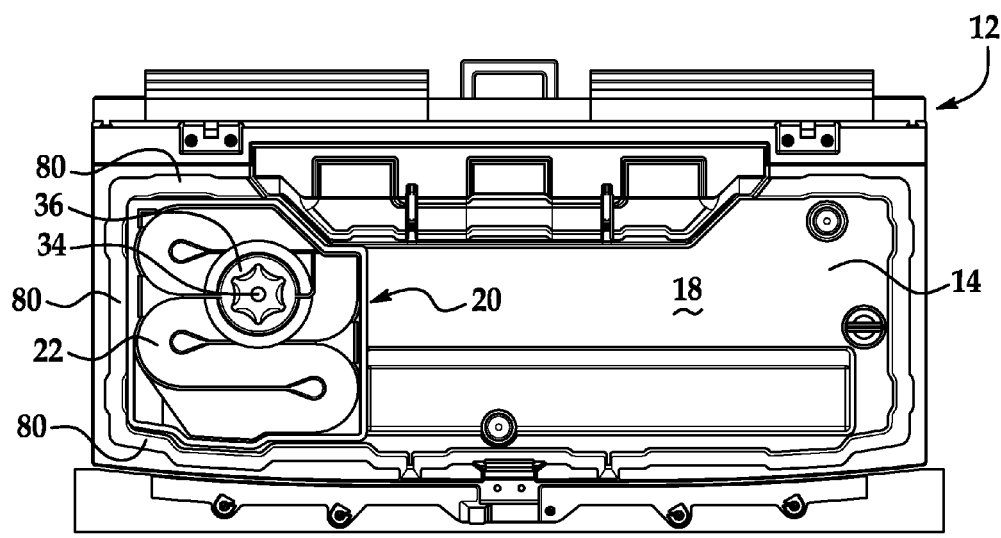
FIG. 10 is a plan view of the storage compartment with an embodiment of the speaker mounting assembly disclosed herein.

FIG. 10 is a plan view of the storage compartment 14 with the speaker mounting assembly 20 installed. As seen, the speaker housing 22 is placed over the opening 17 in the floor 18 of the storage compartment 14 and aligned so that the foot 64 is received in the foot receiving structure 46. The fastener 34 is then inserted through the first fastener receiving aperture 36 and the second fastener receiving aperture 38 in the mounting bracket 30 and tightened.

As seen in FIG. 10, the speaker housing 22 is in close non-contacting proximity with at least two walls 80 of the vehicle storage compartment 14. This is shown in more detail in FIG. 11. This close proximity makes mounting the speaker housing 22 in other locations difficult. For example, to mount the speaker housing 22 near its sides or corners would require clearance for proper movement of a tool to tighten fasteners. This clearance is not provided. With the use of the fastener 34 as shown and without the use of the anti-rotation structure 58 of the foot receiving structure 46 with the cooperating foot 64, the speaker housing 22 can rotate as the fastener is tightened and not align properly when fully tightened. Fully tightening the fastener 34 with the required torque is important to ensure that the speaker housing 22 does not vibrate due to vibration of the subwoofer 24. Any rotation of the speaker housing 22 may cause contact between the speaker housing 22 and one or more walls 80 of the storage compartment 14. This contact would create noise due to the vibration of the subwoofer 24 and/or due to movement during vehicle travel. Furthermore, proper alignment of the speaker housing 22 ensures proper alignment of electrical and other connections.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A speaker mounting assembly comprising:
a speaker housing having a housing support surface;
a speaker mounting bracket having a base surface;
a projection extending from one of the speaker housing and the speaker mounting bracket; and
a mounting structure formed on the other of the speaker housing and the speaker mounting bracket, the mounting structure being configured to receive the projection such that the housing support surface contacts the base surface when the projection is received in the mounting structure, and
wherein the mounting structure is an anti-rotation structure configured to prevent any rotation of the speaker housing with respect to the speaker mounting bracket when the projection is received in the mounting structure.

2. The speaker mounting assembly of claim 1, wherein the projection has at least two non-coplanar wall surfaces and the anti-rotation structure has at least two non-coplanar projection engagement surfaces, wherein the at least two non-coplanar wall surfaces align along a length of the wall surfaces in parallel with the at least two non-coplanar projection engagement surfaces along a length of the projection engagement surfaces when the projection is received in the mounting structure.

3. The speaker mounting assembly of claim 2, wherein the projection extends from a wall of the speaker housing.

4. The speaker mounting assembly of claim 3, wherein the at least two non-coplanar wall surfaces extend substantially perpendicularly with respect to the housing support surface.

5. The speaker mounting assembly of claim 1, wherein the projection and the mounting structure each define corresponding polygonal shapes, with the polygonal shape of the projection configured to fit within the polygonal shape of the mounting structure.

6. The speaker mounting assembly of claim 1, wherein the housing support surface is coplanar with a surface of one or more support legs extending from the speaker housing.

7. The speaker mounting assembly of claim 1, wherein the speaker housing defines a first fastener receiving aperture, and the mounting bracket defines a second fastener receiving aperture, the first and second fastener receiving apertures being located at corresponding locations in each of the housing support surface and the base surface.

8. The speaker mounting assembly of claim 1, wherein the projection extends in an installation direction that is substantially perpendicular from the housing support surface and the base surface, and the anti-rotation structure prevents any rotation of the housing about the installation direction.

9. The speaker mounting assembly of claim 1, wherein the anti-rotation structure fittingly receives the projection to prevent the any rotation of the projection within the mounting structure.

10. A speaker mounting assembly comprising:
a speaker housing having a housing support surface;
a speaker mounting bracket having a base surface;

a projection extending from one of the speaker housing and the speaker mounting bracket; and a mounting structure formed on the other of the speaker housing and the speaker mounting bracket, the mounting structure being configured to receive the projection such that the housing support surface contacts the base surface when the projection is received in the mounting structure, and wherein the mounting structure has an anti-rotation structure configured to prevent rotation of the speaker housing with respect to the speaker mounting bracket, wherein the projection has at least two non-coplanar wall surfaces and the anti-rotation structure has at least two non-coplanar projection engagement surfaces, wherein the at least two non-coplanar wall surfaces align with the at least two non-coplanar projection engagement surfaces when the projection is received in the mounting structure, and wherein the anti-rotation structure includes an emboss defining the at least two non-coplanar projection engagement surfaces and the mounting structure further includes a countersunk surface substantially surrounded by the emboss.

11. The speaker mounting assembly of claim 10, wherein the mounting structure is located on the mounting bracket and the countersunk surface is the base surface.

12. The speaker mounting assembly of claim 11, wherein the at least two non-coplanar projection engagement surfaces extend substantially perpendicularly from the base surface.

13. A speaker mounting assembly for use in a vehicle compartment having a body panel, the assembly comprising:
   a speaker housing;
   a foot extending from the speaker housing, the foot having a housing support surface; and
   a mounting bracket coupled to the body panel and comprising:
      a first surface facing the body panel;
      a second surface opposite the first surface and facing away from the body panel; and
      a foot receiving structure formed on the second surface and having an anti-rotation structure, the foot receiving structure being configured to receive the foot such that the housing support surface contacts the second surface when the foot is received in the foot receiving structure, and wherein the anti-rotation structure prevents rotation of the speaker housing with respect to the mounting bracket, wherein the foot has at least two non-coplanar wall surfaces and the anti-rotation structure has at least two non-coplanar projection engagement surfaces, wherein the at least two non-coplanar wall surfaces align with the at least two non-coplanar projection engagement surfaces when the foot is received in the foot receiving structure such that the anti-rotation structure prevents rotation of the speaker housing with respect to the mounting bracket, and wherein the anti-rotation structure includes an emboss extending from the second surface and defining the projection engagement surfaces, and a portion of the second surface is a countersunk base surface substantially surrounded by the emboss, with the housing support surface contacting the base surface when the foot is received in the foot receiving structure.

14. The speaker mounting assembly of claim 13, wherein the foot and the foot receiving structure each define corresponding polygonal shapes, with the polygonal shape of the foot configured to fit within the polygonal shape of the foot receiving structure.

15. The speaker mounting assembly of claim 13, wherein the body panel is a floor panel and wherein the speaker housing is in close non-contacting proximity with at least two walls of the vehicle compartment.

16. The speaker mounting assembly of claim 13, wherein the speaker housing defines a first fastener receiving aperture, and the mounting bracket defines a second fastener receiving aperture, the first and second fastener receiving apertures being located at corresponding locations in each of the housing support surface and the second surface.

\* \* \* \* \*